United States Patent [19]

Weir-Jones

[11] Patent Number: 5,225,863
[45] Date of Patent: Jul. 6, 1993

[54] REMOTELY OPERATED CAMERA SYSTEM WITH BATTERY RECHARGING SYSTEM

[76] Inventor: Iain Weir-Jones, 4756 W. 4th Avenue, Vancouver, B.C., Canada, V6T 1C2

[21] Appl. No.: 745,386

[22] Filed: Aug. 15, 1991

[51] Int. Cl.⁵ .......... G03B 29/00; G03B 1/00; H04N 7/18; H04N 5/30
[52] U.S. Cl. .......... 354/81; 352/197; 358/108; 358/125; 358/210; 358/229
[58] Field of Search .......... 354/70, 74, 81; 248/58, 248/660; 254/266, 264; 212/76, 83; 358/108, 125, 210, 219; 104/173.1, 238; 352/243, 197

[56] References Cited

U.S. PATENT DOCUMENTS

| | | | |
|---|---|---|---|
| 4,027,329 | 5/1977 | Coutta | 358/108 |
| 4,687,109 | 8/1987 | Davis | 212/76 |
| 4,754,886 | 7/1988 | Hirano | 212/76 |

Primary Examiner—Michael L. Gellner
Assistant Examiner—J. K. Han

[57] ABSTRACT

A remotely operated camera system has a camera on a mobile camera mounting unit suspended from a suspension cable guidingly supporting the camera mounting unit for movement to and fro along a predetermined path of travel. An endless traction cable extends along the path of travel of the camera mounting unit, and is driven so that opposed runs of the traction cable move in opposite directions along the path of travel. Pulleys on the cable mounting unit are wrapped by the opposed runs of the traction cable and a remote control selectively operates the pulleys to transmit drive to the camera mounting unit and thereby to displace the latter in the corresponding direction along the suspension cable. This system avoids having a prime mover or an operator on the camera mounting unit.

10 Claims, 5 Drawing Sheets

REMOTELY OPERATED CAMERA SYSTEM WITH BATTERY RECHARGING SYSTEM

BACKGROUND OF THE INVENTION

1. Field of the Invention

The present invention relates to camera systems and, more particulary, to remotely operated camera systems for use, for example, in the security surveillance of a building or other location, for sporting events, for prisons or border control or in the motion picture and television industries.

2. Description of Related Art

It has previously been proposed to mount a camera on a camera mounting or carriage which is suspended from a suspension cable and which carries a motor for driving the camera mounting or carriage along the suspension cable. The camera mounting or carriage is provided with a seat for carrying a person who operates the system by controlling both the travel of the carriage along the suspension cable and also the aiming of the camera. A drive motor on the carriage drives pulleys around which a traction cable is looped and thus displaces the carriage along the suspension cable.

This previously-proposed arrangement has the advantage that it enables the camera to be moved through an aerial path without the use of a ground-engaging supporting vehicle and/or camera boom, so that the camera may be used in locations which are inaccessible to such a vehicle or beyond the reach of a camera boom.

However, it is in many cases desirable to avoid the use of a prime mover on the carriage but also to provide means on the carriage for generating electrical power for energizing components of the system which are mounted in the carriage. Also, there are many circumstances in which the use of a human operator on the carriage of such a camera system is undesirable, for example in inclement weather or when it is desired to employ a suspension system which is not strong enough to support the weight of an operator.

SUMMARY OF THE INVENTION

It is accordingly an object of the present invention to provide a novel and improved camera system which can be operated so as to control travel of the camera from a remote control location and by the use of a drive motor which is remote from the camera.

According to the present invention, there is provided a remotely operated camera system which has a camera carried by a mobile camera mounting unit and an elongate support for guidingly supporting the camera mounting unit for movement to and fro along a predetermined path of travel. An endless elongate traction member extends along the path of travel of the camera mounting unit and is driven so that opposed runs of the endless traction member move in opposite directions along the path of travel of the camera mounting unit. The camera mounting unit has first and second pulleys in frictional engagement with respective ones of the opposed runs of the elongate traction member, and a remote control for selectively braking the first and second pulleys so as to transmit drive to the camera mounting unit from either of the opposed runs, thereby displacing the camera mounting unit in the corresponding direction along the elongate support.

With such a system, the endless traction member, which in the preferred embodiment of the invention comprises a traction cable, is utilized to transmit drive to the camera mounting unit from a location remote from that unit. Consequently, there is no need to provide a camera operator or a traction motor on the unit itself for driving the unit along its predetermined path of travel. Therefore, the structure of the camera mounting unit and of any structure required for supporting this unit can be made substantially lighter and less expensive that would be necessary if they were also required to support the weight of a prime mover and a camera operator. Also, the camera mounting unit with its camera can be substantially less obtrusive, which may be advantageous in various circumstances.

Preferably, the pulleys are braked by electrical generators and remotely controlled switch are actuatable from a remote control location for connecting the electrical generators for generating electrical current and thereby applying braking torque to the pulleys to provide frictional drive connection between the pulleys and the elongate traction member, which is a traction cable. The electrical current generated in this manner may be used to energize electrical components on the camera mounting unit, which may for example be an microwave transmitter/receiver for exchanging control data with a remote control location, devices for sensing the location and speed of the camera mounting unit and devices for tilting and panning the camera, in addition to the camera itself and a transmitter for transmitting a video signal from the camera.

BRIEF DESCRIPTION OF THE DRAWINGS

The invention will be more readily understood from the following description thereof when taken in conjunction with the accompanying drawings, in which.

DESCRIPTION OF THE PREFERRED EMBODIMENT

Figure 1:
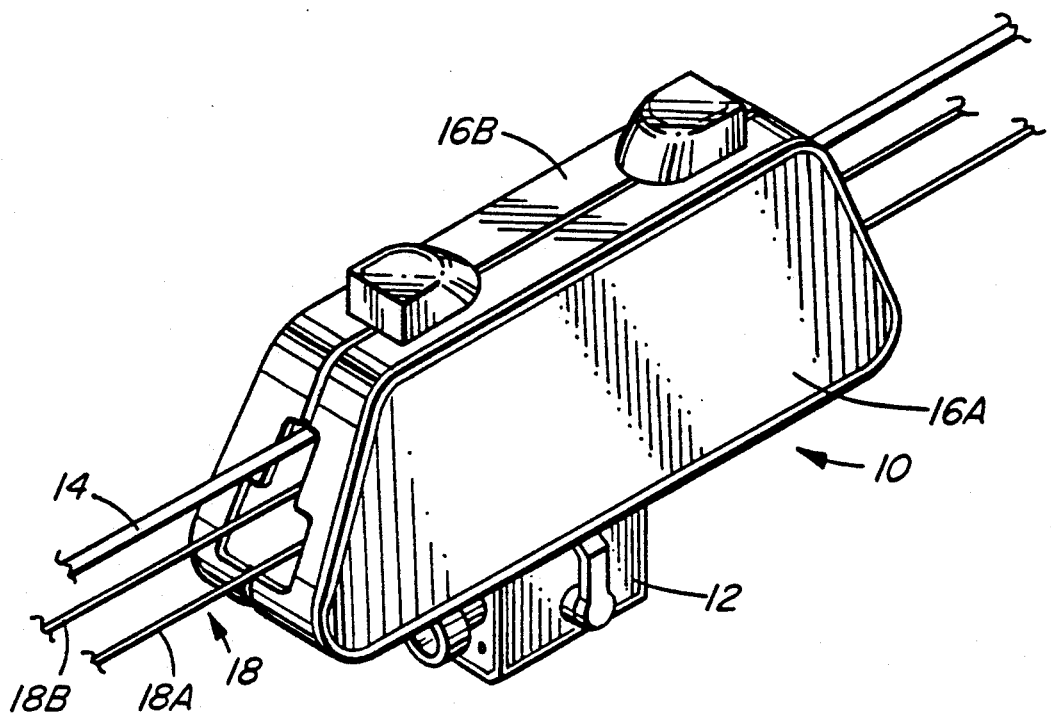
FIG. 1 shows a view in perspective of a remotely controlled camera and camera mounting unit according to the present invention.

Referring firstly to FIG. 1 of the accompanying drawings, reference numeral 10 indicates generally a camera mounting unit carrying a camera 12 and suspended on a suspension cable 14.

The camera mounting unit has a housing formed of complementary housing halves 16A and 16B, through which extend the suspension cable 14 and the laterally spaced opposed runs 18A and 18B of an endless traction cable indicated generally by reference numeral 18.

The traction cable runs 18A and 18B extend below and parallel to the suspension cable 14 and, as described in greater detail below, cause the camera mounting unit 10, and therewith the camera 12, to travel along a path of travel defined by the suspension cable 14.

Figure 2:
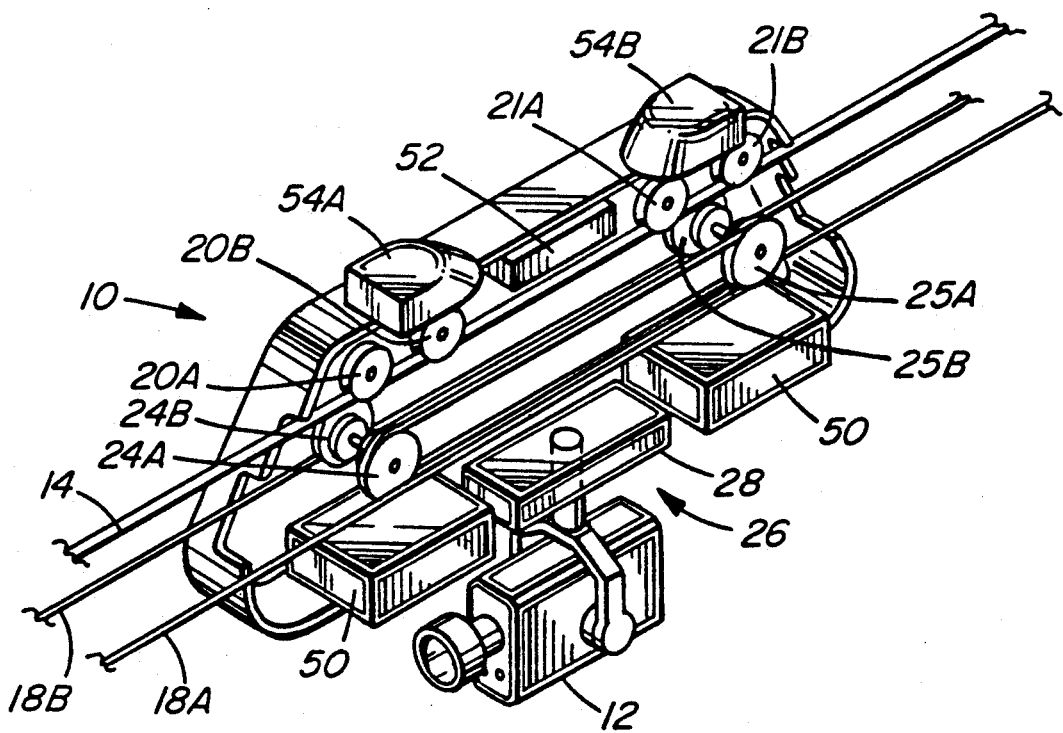
FIG. 2 shows a view corresponding to that of FIG. 1 but with part of a housing of the camera mounting unit removed to show components of the unit.

As shown in FIG. 2, the camera mounting unit 10 is supported on the suspension cable 14 by means of two pairs of support pulleys 20A, 20B and 21A, 21B. The traction cable runs 18A and 18B are looped, as described in greater detail below, around respective pairs of longitudinally spaced traction pulleys 24A, 25A and 24B, 25B.

The pulleys 20A, 20B, 21A, 21B, 24A, 24B, 25A and 25B have their axes of rotation extending transversely of the direction of travel of the camera mounting unit 10, i.e. transversely of the latter.

The camera 12 is suspended below the underside of the camera mounting unit 10 by means of a camera suspension device indicated generally by reference numeral 26, which extends downwardly from a camera control unit 28 located within the housing of the camera mounting unit 10. The camera control unit 28 is operable, in response to control signals transmitted to the camera control unit 28 as described below, to pan and tilt the camera 12.

Figure 3:
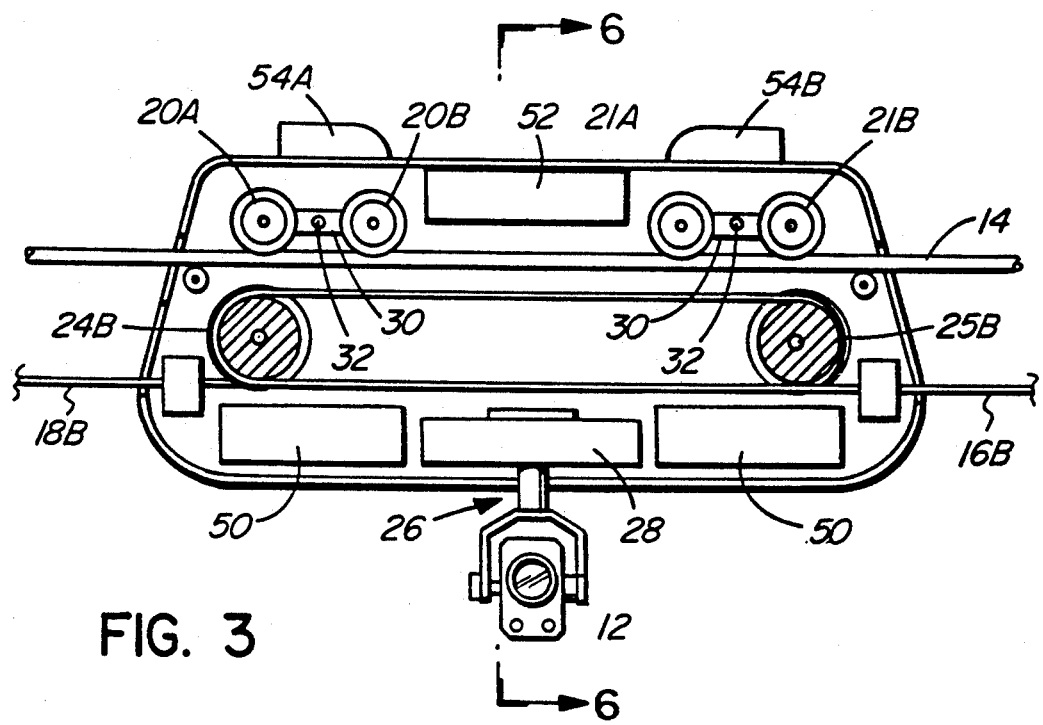
FIG. 3 shows a view in side elevation of the camera and camera mounting unit of FIG. 2.

As shown in FIG. 3, each of the suspension pulley pairs 20A, 20B and 21A, 21B is mounted on a respective support beam 30, which in turn is pivotally mounted on a bolt 32 and secured by a nut 34 in threaded engagement with the bolt 32.

Figure 4:
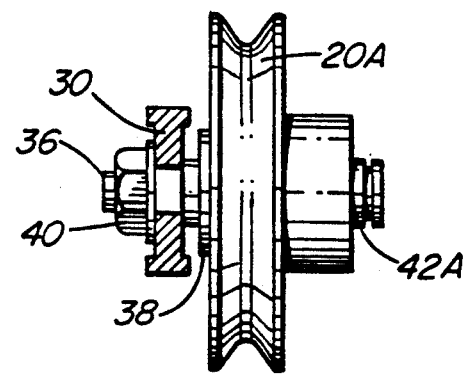
FIG. 4 shows a view in side elevation of a pulley and associated axle and bearing assembly forming parts of the apparatus of FIG. 3.

As shown in FIG. 4, the suspension pulley 20A is journalled on a pulley axle 36 by means of a bearing 38 and rotatably secured to its support beam 30 by a retaining nut 40.

Figure 7:
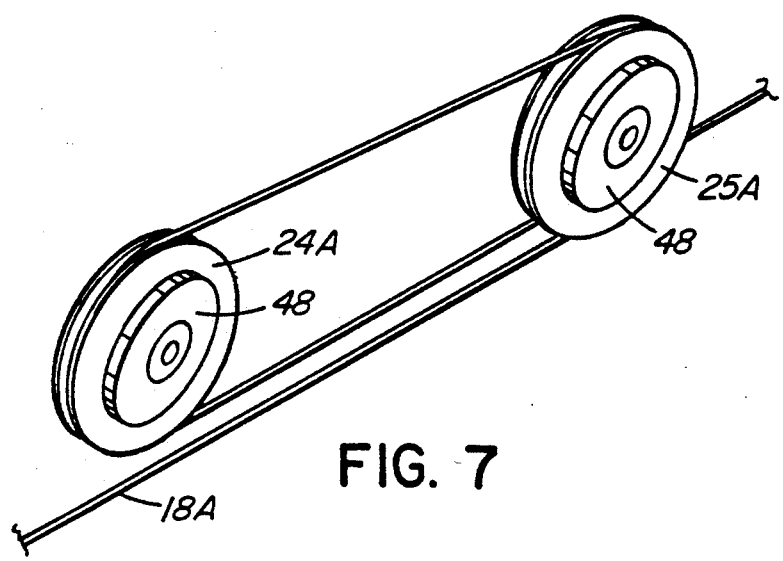
FIG. 7 shows a view in perspective of a pair of pulleys of the camera mounting unit of FIGS. 1 through 6 in a loop in a traction
Figure 7A:
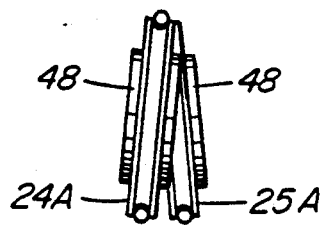
FIGS. 7A and 7B show end elevation of two of the pulleys shown in FIG. 7; cable.
Figure 7B:
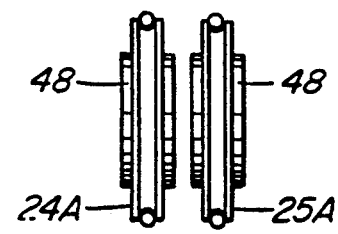

The suspension pulleys 20B, 21A and 21B are similarly rotatably mounted on the beams 30, which are pivotally mounted by their bolts 32 to a chassis assembly indicated generally by reference numeral 42 in FIG. 7. With this arrangement, the pulley pairs 20A, 20B and 21A, 21B can pivot vertically about the bolts 32 to adapt to the catenary curvature of the suspension cable 14, thus improving the overall stability of the camera mounting unit 10.

Figure 5:
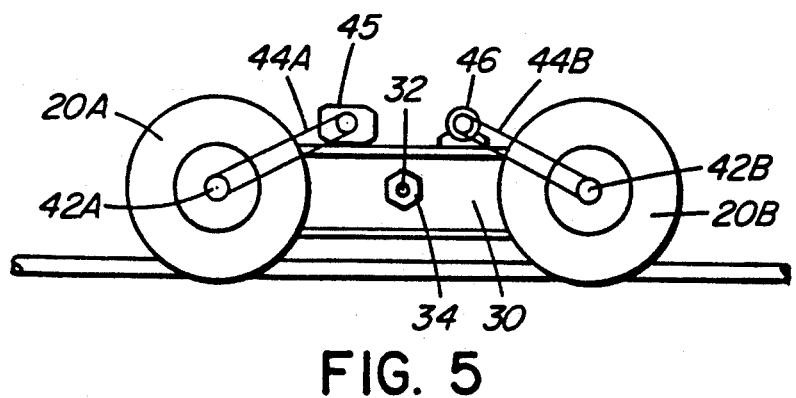
FIG. 5 shows a view in front elevation of the assembly of FIG. 4.

The pulley axles 36 of the suspension pulleys 20A and 20b, as shown in FIG. 5, are provided, at the ends thereof opposite from the retaining nuts 40, with take-off pulleys 42A, 42B.

The take-off pulley 42A is connected by an endless belt 44A to a distance sensor in the form of an optical encoder 45, which is driven by the rotation of the pulley 20A so as to sense the distance of travel of the camera mounting unit 10 along the suspension cable 14.

The take-off pulley 42B is connected by an endless belt 44B to a speed sensor in the form of a D.C. generator 46, which is driven by the pulley 20B so as to sense the speed of travel of the camera mounting unit 10 along the suspension cable 14.

As mentioned above, the traction cable runs 18A and 18B are looped around their respective traction pulley pairs 24A, 25A and 24B, 25B.

As illustrated in FIG. 7 which illustrates the looping of the traction cable run 18A around the pulley pair 24A, 25A, the traction cable run 18A wraps each of the traction pulleys 24A, 25A through 180° and the pulleys 24A and 25A are inclined relative to one another, as shown in FIG. 6A, or offset axially thereof, i.e. transversely of the path of travel of the camera mounting unit 10 along the suspension cable 14 as shown in FIG. 6B, to avoid chaffing of the cable against itself.

Figure 6:
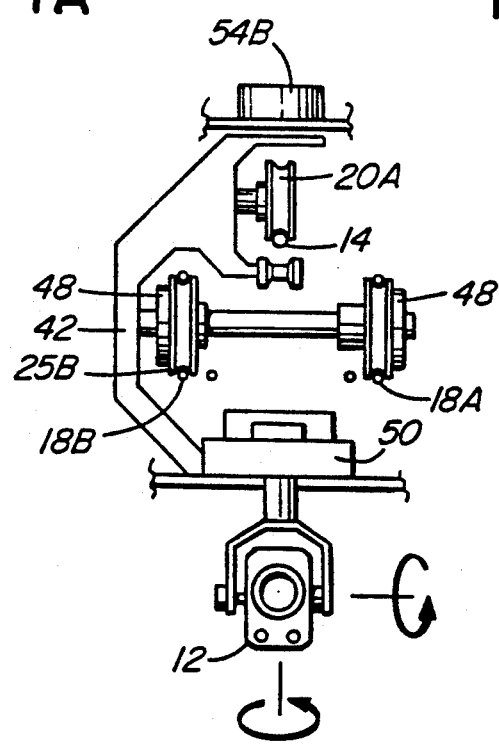
FIG. 6 shows a view taken in cross-section along the line 6—6 of FIG. 3.

FIG. 6 also illustrates that the axles of the traction pulleys 24A, 25A are provided with pancake D.C. electric motors 48.

The pulleys 24B, 25B are similarly looped by the traction cable run 18B, relatively axially off-set from one another and provided with respective pancake D.C. motors 48.

The motors 48 can be switched, by control signals transmitted as described below from a remote control location, to act as generators. When this happens, the motors 48 apply torque to their respective traction pulleys and also generate electrical current which is employed for energizing electrical components of the camera mounting unit.

As will be readily apparent, by using the motors 48 in this way to apply torque to the traction pulleys 24A, 25A, the consequential increase in friction between these two pulleys and the traction cable run 18A will cause the camera mounting unit 10 to travel in one direction along the suspension cable 14. On the other hand, switching of the motors 48 of the other traction pulley pair 24B, 25B to generate current will cause the camera mounting unit 10 to travel in the opposite direction.

The electrical current produced by the motor/generators 48 is employed to recharge storage batteries 50 (FIG. 3) carried in the camera mounting unit 10. These batteries 50 supply an electronic control module 52, which is also carried in the camera mounting unit 10 and which includes components for decoding signals received from a remote control location, which may e.g. be at one end of the path of travel of the camera mounting unit 10, by a microwave link through a microwave receiving antenna 54A mounted on top of the housing of the camera mounting unit 10. These received signals control the travel of the camera mounting unit 10 along the suspension cable 14 and also the panning and tilting of the camera 12.

The control module 52 also includes components for encoding the distance signals generated by the optical encoder 45 and the speed signals generated by the D.C. generator 46 and a microwave transmitter for transmitting this data, and also television signals from the camera 12 and data indicative of the position of the camera 12, through a microwave transmitting antenna 54B on the camera mounting unit housing to the remote control location.

Figure 8:
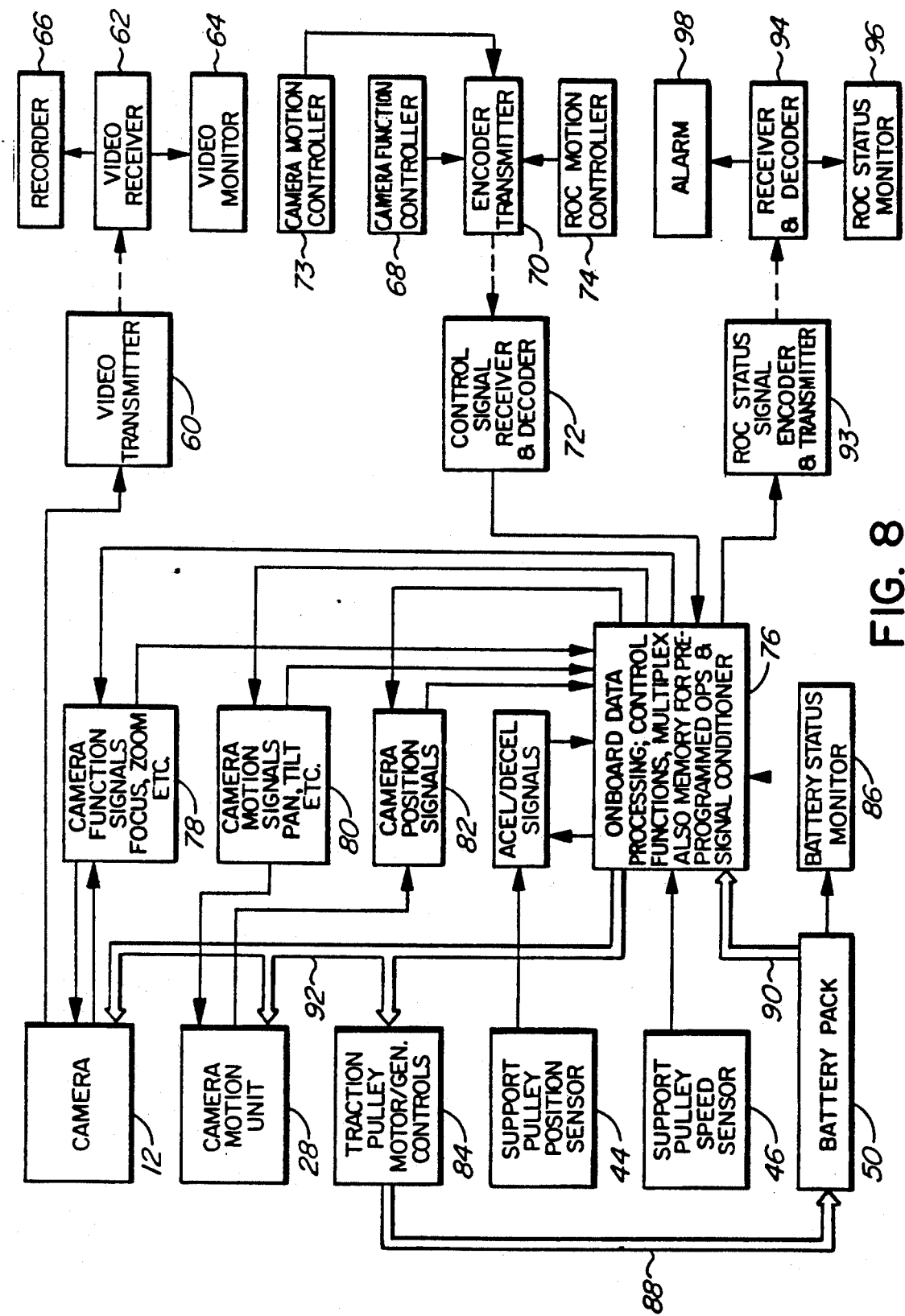
FIG. 8 shows a block diagram of electrical and electronic components of the apparatus of FIGS. 1 through 7.

The electronic components of the present camera operating system are illustrated in greater detail in FIG. 8, from which it can be seen that the camera 12 outputs to a video transmitter 60, which is located in the control unit 52 and the transmission of which is received by a video receiver 62 at the remote control location and displayed on a video monitor 64 and recorded by a video recorder 66.

Signals for controlling the functioning of the camera 12 are generated by a camera function controller 68 and transmitted through an encoder and transmitter 70 for reception by a control signal receiver and decoder 72 in the control module 52.

The panning and tilting of the camera 12 are controlled by signals generated in a camera motion controller 73 and transmitted through the encoder and transmitter 70 to the control signal receiver and decoder 72.

Likewise, a motion controller 74 generates control signals for controlling the travel of the camera mounting unit 10 along the suspension cable 14 and these control signals are transmitted to the control signal receiver and decoder 72.

From the control signal receiver and decoder 72, the signals pass to a data processing and control apparatus 76, which includes digital-to-analog converters for digitizing signals from analog sensors or transducers on the camera mounting unit 10, signal conditioning components, a data acquisition unit including a CPU, a programmable controller with a CPU. The data processing and control apparatus 76 outputs to a camera function control unit 78 controlling the focusing, zooming, running etc. of the camera 12, and to a camera motion control unit 80, which controls the operation of the camera control unit 28 for panning and tilting the camera 12. Feedback signals from the camera control unit 28 are supplied to a camera position signal unit 82, which in turn supplies corresponding signals to the data processing and control apparatus 76. The camera position signal unit 82 comprises rotary potentiometers, but may alternatively comprise a rotary DCDT or an optical recorder.

The data processing and control apparatus 76 supplies control signals to a traction pulley control unit 84, which is provided in the control module 52 and controls the switching of the motors 48 and thus controls the travel of the camera mounting unit 10 to and fro along the suspension cable 14.

The signals from the optical encoder 45 and the D.C. generator 46 are supplied to the data processing and control apparatus 76, as also are output signals from a battery monitor 86 monitoring the batteries 50.

Power conductors 88 and 90 supply the electrical current generated by the traction pulley motors 48 to the batteries 50 and from the latter to the data processing and control apparatus 76, from which electrical current is supplied through another power cable 92 to the camera 12, the camera control unit 28 and the traction pulley control unit 84.

A signal encoder and transmitter 93, provided in the control module 52, receives from the data processing and control apparatus 76 signals which indicate the status of the camera mounting unit and transmits this data by microwave link to a receiver and decoder 94, which outputs to a status monitor 96 and an alarm 98.

Figure 9:
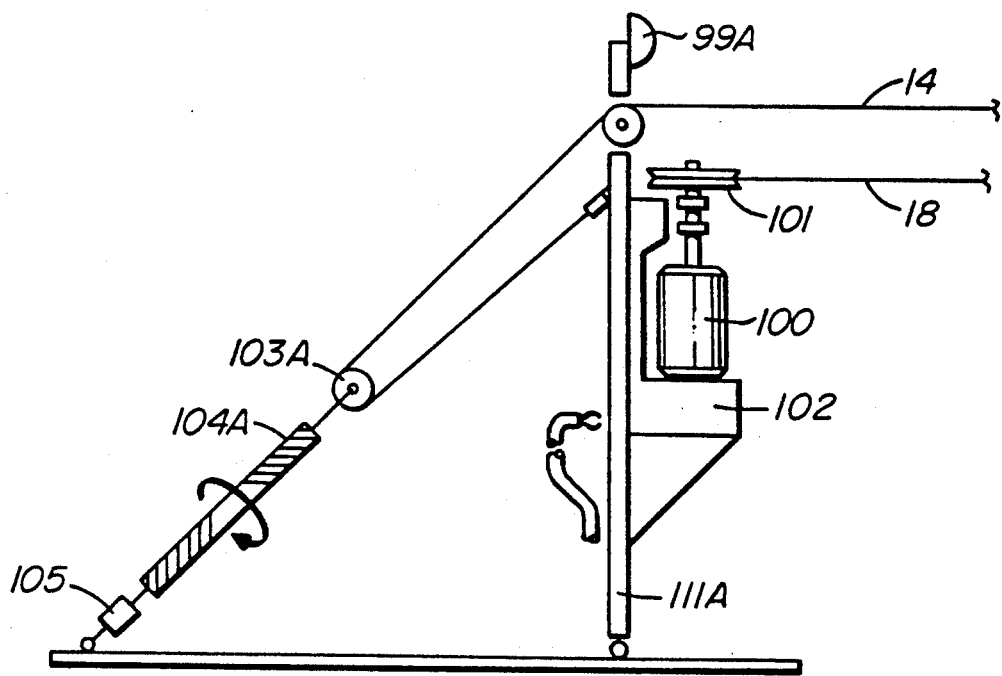
FIGS. 9 and 10 show views in side elevation of equipment provided at the drive end and the tail end, respectively, of the apparatus of FIGS. 1 through 8.
Figure 10:
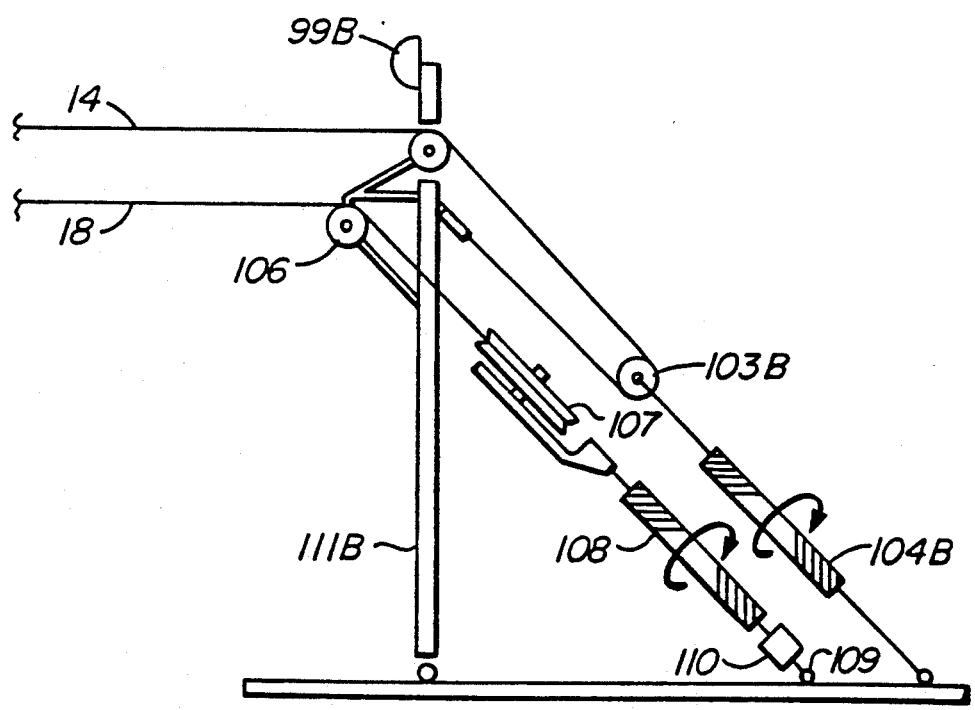

Referring now to FIGS. 9 and 10, which show equipment provided at the opposite ends of the suspension cable 14, microwave transmission and reception antennae 99A and 99B are provided at the opposite ends of the path of travel of the camera mounting unit 10 for sending the control signals to the control signal receiver and decoder 72 and receiving the data transmitted from the status signal encoder and transmitter 93 and the video transmitter 60.

FIG. 9 shows the drive end of the system, i.e. the end at which drive is imparted to the traction cable 18. For this purpose, a variable speed motor 100 drives a sheave or pulley 101 under the control of a motor controller 102 and the pulley 101 is wrapped by the traction cable 18.

Snatch blocks 103a and 103b are provided at opposite ends of the suspension cable 14 and are connected to anchorages through turnbuckles 104a and 104b, so that the tension of the cable 14 can be adjusted as required.

At the tail end of the system, shown in FIG. 10, a tensile load cell or dynamometer 105 is provided for monitoring the tension in the suspension cable 14. Also, the endless traction cable 18 is deflected over a pair of sheaves 106, of which only one is shown, and guided around a tail pulley 107, which is undriven but which may, if required, be provided with a brake (not shown). A turnbuckle 108 connected to the tail pulley 107 is adjustable to correspondingly vary the tension and general adjustment of the traction cable 18. The turnbuckle 108 is connected to an anchorage 109 through a load cell or dynamometer 110, which is employed to monitor the tension in the traction cable 18.

The opposite ends of the system are supported by support columns 11A and 11B, and similar support columns (not shown) may, if required, be provided along the length of the system between the columns 111A 1nd 111B.

In situations where it is not important if a portion of the full length of the system is inaccessible to the camera mounting unit 10, the traction cable tensioning system comprising the sheave 107, the turnbuckle 108 and the load cell or dynamometer 110 may be mounted to the left, as viewed in FIG. 10, of the column 111B This would eliminate the need for deflection sheaves 106 and would reduce frictional losses.

As will be apparent to those skilled in the art, various modifications may be made to the above-described apparatus within the scope and spirit of the appended claims.

For example, the camera mounting unit 10 may be designed to run along a track or rail, instead of a suspension cable, and if the track or rail is on the ground, the camera will be moved from the underside of the camera mounting unit.

It is also possible to clamp or otherwise secure the camera mounting unit 10 to one of the traction cable runs 18a and 18B, in which case the speed and direction of motion of the camera mounting unit would be controlled by the drive motor 100 of FIG. 9. Such an arragement is useful, for example, when it is desirable to reduce the number of control signal sent to the camera mounting unit 10. The unclamped pulleys 24A, 24B and 25A, 25B may in that case still be used for power generation to power the camera 12 and the video transmitter 60, and also the status signal encoder and transmitter 93 and associated electronic equipment.

It is also possible to construct the system so as to carry and displace the weight of a human operator in addition to the camera, for example by replacing the camera mounting unit 10 by a platform or carriage providing seating and facilities for a cameraman and his equipment and also, if required, an operator/dr. In that case, the structures of the various components of the system would be designed to withstand the forces associated with the loads induces by carrying such personnel. Such a manned system would have a substantially increased wheelbase, and possibly as great as 6 m to 8 m, in order to provide the degree of stability required for camera operation in the motion picture and television industries.

By varying the tension in the suspension cable 14 and the traction cable 18, the camera mounting unit 10 may be caused to travel along a non-linear path, in a motion which may for example be somewhat similar to that of a hedgehopping aircraft. Hydraulic or mechanical actuators, controlled by a programmed control unit, may in that case be employed to adjust the cable tensions as required to displace the camera mounting unit vertically, for example in response to the signals indicating the horizontal location of the camera mounting unit 10.

I claim:

1. A remotely operated camera system, comprising:
   a camera:
   a mobile camera mounting unit carrying said camera:
   an elongated support for guidingly supporting said camera mounting unit for movement to and fro along a predetermined path of travel;
   an endless elongate traction member extending along the path of travel of said camera mounting unit;
   means for driving said endless traction member so that opposed runs of said endless traction member move in opposite directions along the path of travel of said camera mounting unit;
   said camera mounting unit having first and second rotatable means for engagement with respective ones of the opposed runs of said elongate traction member;
   means for generating electrical power in response to rotation of said first and second rotatable means by said elongate traction member; and
   means for connecting said camera mounting unit to one of the opposed runs of said elongate traction member so as to displace said camera mounting unit in the corresponding direction along said elongate support.

2. A remotely operated camera system as claimed in claim 1, wherein said elongate traction member comprises a traction cable; said rotatable means comprise pulleys in frictional engagement with said traction cable for rotation thereby; and said means for connecting said camera mounting unit comprise remote control means for selectively causing braking of the rotation of said pulleys by said traction cable to thereby provide a frictional drive connection between said traction cable and said camera mounting unit.

3. A remotely operated camera system as claimed in claim 1, wherein said elongate traction member comprises a traction cable; said rotatable means comprise pulleys in frictional engagement with said traction cable for rotation thereby; said power generating means comprise means for braking the rotation of said pulleys by said traction cable and said means for connecting said camera mounting unit comprise remotely controlled switch means for selectively switching said power generating means for generating electrical current and thereby applying braking torque to said pulleys to provide a frictional drive connection between said traction cable and said camera mounting unit.

4. A remotely controlled camera system as claimed in claim 3, further comprising electrically-energizable components on said camera mounting unit and means for connecting the electrical current from said generating means to said electrically-energizable components for energizing the latter.

5. A remotely controlled camera system as claimed in claim 4, wherein said electrically-operable components comprise microwave transmitter and receiver means for transmission of control data between said camera mounting unit and a remote control location.

6. A remotely operated camera as claimed in claim 1, wherein said elongate traction member comprises a traction cable; said first and second rotatable means each comprise a pair of pulleys spaced apart along the respective run of said traction cable, said traction cable being looped around said pairs of traction pulleys and control means comprise means for selectively causing braking of either of said pairs of pulleys.

7. A remotely controlled camera system as claimed in claim 1, wherein said elongate support member comprises a suspension cable and said camera mounting unit includes pulley means for suspending said camera mounting unit from said suspension cable, said camera mounting unit further comprising means responsive to rotation of said pulley means, as said camera mounting unit travels along said suspension cable, for providing output signals indicative of the location of said camera mounting unit along the path of travel thereof and means for transmitting the output signals to a remote control location.

8. A remotely operated camera system as claimed in claim 3, wherein said first and second rotatable means each comprise a pair of said pulleys spaced apart along the respective run of said traction cable with said traction cable being looped around said pairs of traction pulleys.

9. A remotely operated camera as claimed in claim 8, wherein said elongate support member comprises a suspension cable and said camera mounting unit includes suspension pulley means for suspending said camera mounting unit from said suspension cable, said camera mounting unit further comprising means responsive to rotation of said suspension pulley means, as said camera mounting unit travels along said suspension cable, for providing output signals indicative of the location of said camera mounting unit along the path of travel thereof and means for transmitting the output signals to a remote control location.

10. A remotely controlled camera system as claimed in claim 9, said camera mounting system further comprising microwave transmitter and receiver means for transmission of control data between said camera mounting unit and a remote control location and means for connecting the electrical current from said power generator means to energize said transmitter and receiver means.

* * * * *